United States Patent Office 3,184,087
Patented May 18, 1965

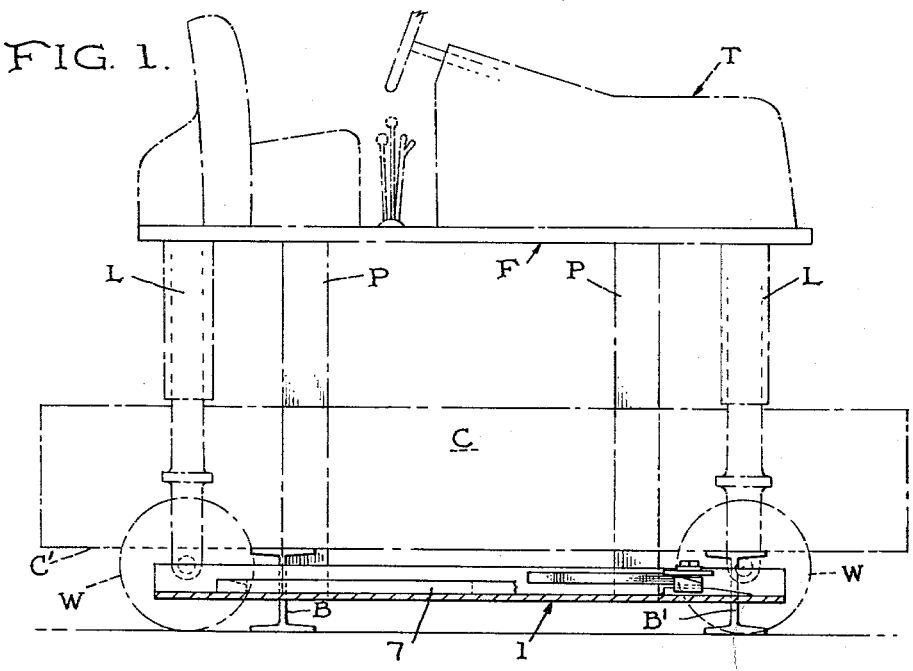
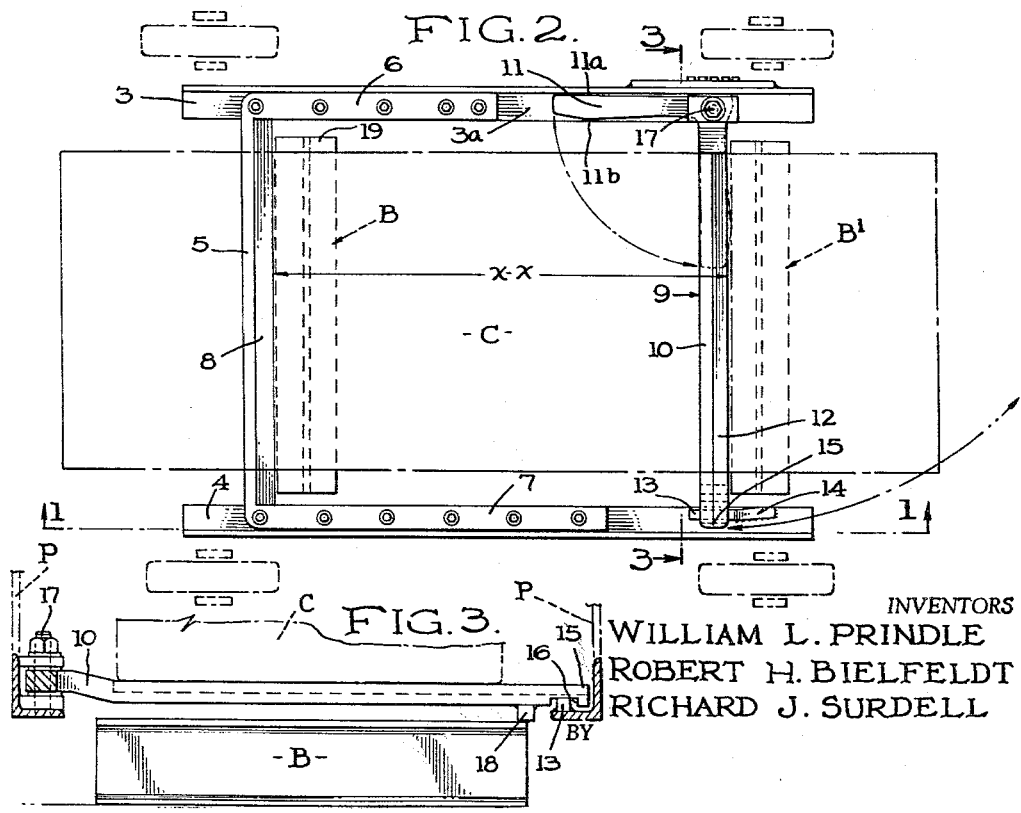

3,184,087
STRADDLE TRUCK SUPPORT SHOE
William L. Prindle, Chicago, Robert H. Bielfeldt, Midlothian, and Richard J. Surdell, Lansing, Ill., assignors to Republic Steel Corporation, Cleveland, Ohio, a corporation of New Jersey
Filed Feb. 25, 1963, Ser. No. 260,377
3 Claims. (Cl. 214—392)

This invention relates generally to material handling apparatus of the type referred to as straddle lift trucks, and more particularly to the support shoe of such a vehicle.

Lift trucks of the above class are adapted to approach and straddle the intended load, usually comprising stacked bars, billets, panels, etc., and to elevate the load for transporting it to another location.

In the case of handling stacks comprising a plurality of panels such as plywood or sheet steel, it may only be necessary to grip the underside of the lateral edges of the stacked material in order to elevate and transport the load. Accordingly, many of the prior devices include support shoes having only a plurality of short arms projecting inwardly from the shoe sides for supporting the load from its side edges.

In cases as above, there usually is no problem in approaching such a load, as the bolsters or pallets supporting the load off the floor can be smaller than the lateral dimension of the stacked panels and the projecting arms of an approaching support shoe are provided suitable clearance as the truck straddles the load. However, in the case of a load comprising a plurality of stacked bars or billets, it is necessary to provide continuous supporting means extending the entire lateral dimension of the load. For obvious safety reasons, a full lateral support would even be desirable in the case of loads comprising sheets or panels.

If a support shoe is provided with full width support arms, then it will be apparent that suitable means must be available to permit the approach of the truck to the load as it is situated on bolsters or pallets, since a support arm extending between the two side support shoes of the truck would normally strike the bolsters or pallets under the load, thus preventing the truck from straddling the load.

Accordingly, one of the principal objects of the present invention is to provide a straddle truck support shoe having full width load-supporting arms.

Another object of this invention is to provide a straddle truck support shoe having a pivotal support arm adapted to be moved from a load-engaging to a load-approaching or departing position.

Still another object of the invention is to provide a straddle truck support shoe assembly having a pivotal support arm adapted to automatically begin its opening or closing operation upon movement of the straddle truck over or away from a load, thereby obviating the necessity of requiring any manual or mechanical assistance in the operation of the pivotal support arm.

With these and other objects in view which will more readily appear as the nature of the invention is better understood, the invention consists in the novel construction, combination, and arrangement of parts, hereinafter more fully described, illustrated, and claimed.

A preferred and practical embodiment of the invention is shown in the accompanying drawings, in which:

FIGURE 1 is a side elevation in section of the support shoe taken on the line 1—1 of FIGURE 2 and showing a typical lift truck in broken lines.

FIGURE 2 is a top plan view of the invention and illustrates the open position of the pivotal support arm in broken lines.

FIGURE 3 is an elevation, partly in section, of the movable support arm taken on the line 3—3 of FIGURE 2.

Similar reference characters designate corresponding parts throughout the several figures of the drawing.

Referring to the drawings, it will be seen, particularly in FIGURE 1, that the support shoe, generally designated 1 is provided with suspension means retaining it between the wheels W or within the tread dimensions of the straddle truck T. The type of suspension means for the support shoe forms no particular part of the present invention as any suitable conventional arrangement may be provided to suspend and permit vertical adjustment of the support shoe assembly 1. In the instant apparatus, a plurality of rigid lift posts P are shown fixedly attached at their upper ends to the frame F of the straddle truck and secured at their lower ends to the side frame channels 3 and 4 of the support shoe.

In order to provide for vertical adjustment of the shoe assembly 1, the legs L of the truck may be of telescopic construction and include any suitable means, such as hydraulic or pneumatic cylinders, to cause vertical movement of the truck frame F and therefore the attached shoe assembly 1. Alternatively, the lift posts P may be movably attached to the truck frame F and provided with suitable control means to permit vertical adjustment thereof.

The support shoe assembly 1 comprises a pair of parallel side frame channels 3 and 4 extending approximately the length of the wheelbase of the truck. A stationary transverse support arm 5 extends between the spaced apart side frame channels 3 and 4 adjacent the rearward ends of the channels and includes forwardly projecting terminal arms 6 and 7 disposed normal to the transverse portion 5 and suitably anchored to the channels. The forward or leading edge of the stationary support arm 5 is provided with a bevel 8 along its upper surface for reasons which will become apparent hereinafter.

The U-shaped arrangement of the stationary arm 5 and its terminal arms 6 and 7 maintains the side frame channels 3 and 4 parallel to one another, to provide rigidity to the support shoe assembly 1, since there is no other structure which rigidly interconnects the left-hand side frame channel 3 to the right-hand channel 4.

A pivotal or movable support arm, generally designated 9, is located adjacent the forward or leading edges of the channels 3 and 4 and is adapted to be moved from a carrying or operative position as shown in full lines in FIGURE 2, to a loading or unloading position as represented by the curved arrow lines in this figure.

The pivotal support arm 9 includes a transverse pivot arm 10 and a pivot arm handle 11 disposed normal to said transverse pivot arm 10. Means 17 are provided at the juncture of said handle 11 and pivot support arm 10 to provide for pivotal attachment of the pivot arm assembly to the left-hand side frame channel 3 in order to permit movement of the pivot support arm to and from its alternate, or open and closed positions. The perpendicular arrangement of the pivot arm handle 11 with respect to the pivot support arm section 10 provides positive stop means for the pivot support arm 10 so that when the outside edge 11a of the handle abuts the vertical wall of the channel 3, the pivot support arm 10 will be disposed transverse of the channels 3 and 4 and will be in the operative position as shown in full lines in FIGURE 2. Preferably, in the above situation, the leading edge 11b of the handle 11 will overlie the base 3a of the side frame channel 3.

A bevel 12 extends substantially the full length of the pivot support arm 10 along the upper forward portion, thus providing a leading edge therefor, similar to the previously described bevel 8 along the stationary transverse support arm 5. A pivot arm rest 13 is attached to the base of the forward part of side frame channel 4 and is provided with an inclined forward portion 14 which inclined portion engages the undersurface of the free end 15 of pivot support 10 within the recess 16 provided therein. The pivot arm rest 13 may be curved longitudinally as shown in FIGURE 2 to correspond to the radius described by the free end of the pivot support arm 10 as it is moved about its pivot pin 17.

In order to support the weight of the pivot support arm 10 when it is not in the operative position shown in FIGURE 2, a skid 18 having an arcuate shaped periphery is attached to the undersurface of the arm 10 adjacent the recess 16. It will thus be seen that when the arm is swung away from its operative position, and the free end thereof is no longer supported on the pivot arm rest 13, the weight of the pivot arm assembly will be adequately supported on the surface of the ground by means of the pivot arm skid 18. Of course, the skid would be utilized only when the support shoe assembly was disposed near the ground surface.

The operation of the apparatus will now be described.

Usually loads are maintained in storage upon supporting means or bolsters such as the I-beams B—B' illustrated in the drawings. For obvious reasons, these supporting bolsters should not extend laterally a distance any greater than the tread of the straddle truck.

In order to insure the automatic operation of the pivot support arm assembly 9, it will be noted that the distance X—X between the rearwardly facing edges of the two bolsters B—B' should be at least as great as the length of the pivot support arm 10. The reason for this requirement will become apparent from the following description of operation.

To pick up a load C disposed upon the bolsters B—B', the pivot support arm 10 is swung outwardly to coincide with the longitudinal axis of the channel 3 whereby the handle 11 will project outwardly as shown by the dotted line position of FIGURE 2. In this open position, the projecting handle 11 is the only obstruction in the passageway between the side channels, other than the stationary arm 5. The straddle truck is then driven up to one end of the load whereafter it proceeds to straddle the load with one of each of the channels 3 and 4 of the support shoe assembly disposed on each side thereof. The support shoe assembly is maintained at a level which is at least below the undersurface C' of the load so that the projecting handle 11 and stationary transverse supporting arm 5 will clear beneath the undersurface of said load. The bevel 8 on the stationary arm 5 will assist in preventing any abrupt collision with the bottom edge of a load should the supporting shoe assembly 1 be inadvertently set at a height insufficient to clear under the load. It will thus be seen that if the bottom corner of the load strikes the bevel 8, the load will be guided upwardly onto the top of the stationary support arm 5.

After the truck has partially straddled the load, continued advancement will cause the leading edge 11b of the outwardly projecting handle 11 to strike the rear edge of the first bolster B. It will thus be seen that further movement of the support shoe assembly to the right in FIGURE 2 will cause the handle 11 to be deflected towards the channel 3 by the rear edge and end 19 of the stationary bolster B. This, in turn, swings the free end 15 of support arm 10 towards the opposite side frame channel 4. Since the distance X—X between the rear edges of the bolsters B—B' is at least as great as the length of arm 10, sufficient clearance is provided for the above action.

As the truck progresses further, the end 15 of the partially closed pivot arm will be guided along the rear edge of the bolster B' until the final or closed position as shown in FIGURE 2 is achieved whereby the free end 15 will be resting upon the pivot arm rest 13 and the edge 11a of the handle will abut the vertical wall of the side frame channel 3.

The support shoe assembly 1 is then elevated with respect to the truck frame by suitable means as previously described whereby the stationary supporting arm 5 and pivot support arm 9 will engage the undersurface C' of the load to elevate same from the supporting bolsters B—B'. Thereafter, the straddle truck may move either forwardly or rearwardly to clear the supporting bolsters and proceed to transport the load to the desired location.

The above procedure is reversed in order to unload the cargo C upon suitable supporting means located elsewhere.

After letting the load down on bolsters B—B', the truck T is backed away from the straddled load. As viewed in FIGURE 2, the support shoe assembly would be moved towards the left whereupon the rear edge of the pivot arm 10 would strike the bolster B causing the pivot arm assembly to pivot around the end 19 of bolster B and to assume the open position with handle 11 projecting outwardly from channel 3.

We claim:

1. In a straddle truck having load-lifting means vertically adjustable in relation to the ground, a support shoe assembly attached to said lifting means and comprising, a pair of parallel side frame channels, a stationary transverse support arm connecting said channels adjacent one end thereof, a movable support arm adjacent the opposite ends of said channels and including pivot means at one end for attachment to one of said channels, a handle joined to said movable arm adjacent said pivot means and disposed normal to said movable arm, said movable support arm when in an operative position extending from one of said channels to the other of said channels with said handle parallel to one of said channels, whereby said movable arm may be pivoted out of the way to provide an unobstructed passageway between said channels back to said stationary support arm.

2. A straddle truck support shoe assembly according to claim 1, wherein, said stationary support arm is disposed adjacent the rearward ends of said channels with said movable support arm disposed adjacent the forward ends of said channels, and a free area is defined between said arms, an arm rest adjacent the forward end of one of said channels having an inclined forward portion for supporting the free end of said movable support, and the underside of the free end of said movable arm is provided with a recess for engaging said arm rest.

3. In a straddle truck having load-lifting means vertically adjustable in relation to the ground, a support shoe assembly attached to said lifting means and comprising, a pair of parallel side frame channels, a stationary transverse support arm spanning said channels adjacent one end thereof, a movable support arm pivotally attached at one end to one of said channels adjacent the opposite end of said channels, control means connected normal to said movable arm adjacent said pivotal attachment, said control means adapted to cooperate with one of said channels to limit the rearward pivotal movement of said movable arm to an operative position transverse of said channels, whereby, when said movable arm is pivoted to a position parallel with said channels said control means projects outwardly from one of said channels toward the other of said channels.

References Cited by the Examiner
UNITED STATES PATENTS

| | | | |
|---|---|---|---|
| 1,757,798 | 5/30 | Grab | 214—392 |
| 2,512,333 | 6/50 | Jaffa et al. | 214—392 |
| 2,576,345 | 11/51 | Jacob | 214—392 |
| 2,693,288 | 11/54 | Black | 214—390 |
| 2,822,944 | 2/58 | Blomgren | 214—390 |

HUGO O. SCHULZ, *Primary Examiner.*
GERALD M. FORLENZA, *Examiner.*